United States Patent
Schnell et al.

(10) Patent No.: US 8,379,780 B2
(45) Date of Patent: Feb. 19, 2013

(54) METHOD FOR COMPENSATION OF INFORMATION LOSSES IN AN OFDM-BASED MULTI-CARRIER COMMUNICATION SIGNAL CAUSED BY BLANKING OUT PULSE-SHAPED INTERFERENCES

(75) Inventors: Michael Schnell, Gilching (DE); Sinja Brandes, Neufahrn (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 867 days.

(21) Appl. No.: 12/500,962

(22) Filed: Jul. 10, 2009

(65) Prior Publication Data
US 2010/0008454 A1    Jan. 14, 2010

(30) Foreign Application Priority Data
Jul. 12, 2008 (DE) .......................... 10 2008 032 913

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ...................................................... 375/346
(58) Field of Classification Search .................. 375/130, 375/140, 141, 144, 147, 235, 260, 296, 316, 375/344, 346, 347, 348, 356, 362; 370/203, 370/204, 208, 210, 310, 335, 342
See application file for complete search history.

(56) References Cited

U.S. PATENT DOCUMENTS

| | | | |
|---|---|---|---|
| 7,706,428 B2 * | 4/2010 | Wilhelmsson et al. | 375/144 |
| 2004/0086027 A1 * | 5/2004 | Shattil | 375/146 |
| 2005/0220001 A1 | 10/2005 | Henriksson | |
| 2006/0113095 A1 | 6/2006 | Radke et al. | |
| 2006/0198453 A1 | 9/2006 | Huang et al. | |
| 2008/0137723 A1 * | 6/2008 | Liu | 375/235 |

OTHER PUBLICATIONS van Nee et al., "OFDM for Wireless Multimedia Communications", Artech House, pp. 33-51.
Zhidkov, "Analysis and comparison of Several Simple Impulsive Noise Mitigation Schemes for OFDM Receivers", Jan. 2008, pp. 5-9.

(Continued)

Primary Examiner — David C. Payne
Assistant Examiner — Syed Haider
(74) Attorney, Agent, or Firm — Renner, Otto, Boisselle & Sklar, LLP

(57) ABSTRACT

A method for compensation of information losses caused by blanking out pulse-shaped interferences in a communication signal, wherein a receiver receives a modulated OFDM-based signal comprising an overlap of a sequence of a predetermined number of subcarrier signals whose frequencies differ by a constant amount and which have substantially no signal portions at the frequencies of the respective other subcarrier signals, and pulse-shaped interference signals. The pulse-shaped interference signals are eliminated by pulse blanking. The obtained signal in the frequency domain is characterized in that the signal portions at each subcarrier frequency consist of an overlap of determinable signal portions respectively of all other subcarrier signals. From the respective signal portion at a subcarrier frequency, those determinable signal portions are subtracted in the frequency domain which result from the subcarrier signals of all other subcarriers and are reconstructed from an estimation of the complex data symbols transmitted on each subcarrier.

4 Claims, 5 Drawing Sheets

OTHER PUBLICATIONS

Gao, "DME/TACAN Interference and its Mitigation in L5/E5 Bands", 10 pages.

Zhidkov, "Performance Analysis and Optimization of OFDM Receiver with Blanking Nonlinearity in Impulsive Noise Environment", Jan. 2006, pp. 234-242.

Zhidkov, "Impulsive Noise Suppression in OFDM Based Communication Systems", Nov. 2003, pp. 944-948.

Brigham, "FFT-Anwendungen", 1997, pp. 80-82.

Chantaranotai, "Improved Iterative Detection for OFDM Communication System with Impulsive Noise", Apr. 2009, pp. 101-104.

* cited by examiner

METHOD FOR COMPENSATION OF INFORMATION LOSSES IN AN OFDM-BASED MULTI-CARRIER COMMUNICATION SIGNAL CAUSED BY BLANKING OUT PULSE-SHAPED INTERFERENCES

This application claims priority of German Patent Application No. 10 2008 032 913.4 filed Jul. 12, 2008, which is hereby incorporated herein by reference in its entirety.

BACKGROUND OF THE INVENTION

The present invention relates to a method for compensation of information losses, which have been caused by blanking out pulse-shaped interferences, in a communication signal received by a receiver. Particularly, the invention relates to the application of said compensation method in communication signals on the aviation sector, namely in systems based on "Orthogonal Frequency-Division Multiplexing" (OFDM).

The number of frequency bands available for aeronautical communication is limited so that the increasing demand for communication makes it necessary to search for new solutions. One possible approach is seen in using that range of the frequency bands which serves, inter alia, for operation of ground-based systems provided for distance and/or position determination of aircraft, e.g. the so-called "Distance Measuring Equipment" (DME) or the "Tactical Air Navigation System" (TACAN) which is also employed for military purposes. These systems use the aeronautical range of the L-band between 960 and 1.215 MHz which is subdivided into frequency channels of a respective width of 1 MHz, each of said channels serving for transmission of pulse-shaped signals with high amplitudes. Operated in this frequency range are also military radio systems for data transmission, such as e.g. the so-called "Joint Tactical Information Distribution System" (JTIDS) or the "Multifunctional Information Distribution System" (MIDS). In these systems, frequency channels of a width of respectively 3 MHz are used according to the frequency hopping method; thus, said systems will again generate short pulse-shaped signals on each channel.

The frequency range in which already DME and other systems are operated, is now also to serve for transmitting, parallel to the pulse signals, communication signals which use center frequencies with no or only small frequency offsets to the center frequencies of the pulse signals. For communication, it is provided to use so-called OFDM-based signals. Signals of this type are basically known and are characterized by a sequence of subcarrier signals whose frequencies differ from each other by a constant amount, each subcarrier signal having substantially no signal portions at the frequency of the other subcarrier signals so that substantially no inter-carrier interference (ICI) will occur; see also [1].

However, in the approach according to the invention, a problem would reside in that the useful signal, i.e. the communication signal, is massively impaired by pulse-shaped interference signals (e.g. the DME signals) because the power level of the OFDM-based communication signal is considerably smaller than the power level of the DME signals.

In a general manner, the above described problem can be formulated to the effect that, depending on the respective frequency band in which the OFDM-based system is operated, there will occur, at the receiver, pulse-shaped interferences from other systems which are operated in the same or the adjacent frequency band. These interferences, though being very short and thus impairing the OFDM signal only for a short time, mostly have a very high power and take a significant influence on the OFDM system.

Due to their high power, the interference pulses and, respectively, the samples of the OFDM signal affected by the interference are easily detectable. If the detected power has a sample value above a specific threshold value, the respective sample value is set to zero or its amplitude is reduced to a threshold value. The state of the art includes techniques provided to weaken pulse-interfering factors in communication or navigation systems. For this purpose, one will largely use the techniques of "pulse blanking" or "clipping" (amplitude limitation) or combinations of both techniques (see e.g. [2] and [3]).

Both in pulse blanking and in clipping, the influence of the pulse-shaped interference is considerably reduced, thus effecting an improvement of the overall performance of the OFDM system. However, the process will have an influence not only on the interference signal but also on the desired OFDM signal; this will entail losses in performance, causing a distinct reduction of the benefits obtained by pulse blanking or clipping.

In literature, it has already been discussed in [4], in the context of impulsive noise, what kinds of effects the technique of pulse blanking has on the performance of OFDM receivers and in what manner such influences can be reduced by optimizing the threshold value for pulse blanking in the OFDM receiver.

Further, in US-A-2006/0198453, US-A-2005/0220001, US-A-2006/0116095 and [5], techniques for compensating the impact of pulse blanking onto the desired OFDM signal have been proposed. All four techniques have in common that they subtract a compensation signal from the received frequency domain signal. In the first three references, the compensation signal is generated in the time domain with the objective to estimate ICI and those parts of the desired OFDM signal that have been blanked in the time domain received signal. However, the techniques according to the first three references are not targeted to directly reconstruct ICI in the frequency domain by exploiting known characteristics of OFDM signals in general and of the applied pulse blanking in particular. The technique according to [5] aims at estimating and subtracting the impulsive noise signal itself.

SUMMARY OF THE INVENTION

The present invention has been designed to compensate for information losses in the frequency domain caused by blanking out pulse-shaped interferences in an OFDM-based multi-carrier communication signal received by a receiver.

To this end, the invention proposes a method for compensation of information losses caused by blanking out pulse-shaped interferences, in a communication signal received by a receiver, wherein, in said method,
  the receiver receives a modulated OFDM-based multi-carrier signal comprising an overlap of a sequence of a predetermined number of subcarrier signals whose frequencies differ from each other by a constant amount and which have substantially no signal portions at the frequencies of the respective other subcarrier signals, with pulse-shaped interference signals,
  the pulse-shaped interference signals are eliminated in the receiver by pulse blanking in that the interfering pulses are first detected and then the modulated time domain signal is set to zero at the points affected by the pulse-shaped interference,
  the thus obtained signal, when represented by way in the frequency domain, is characterized in that the signal portions at each subcarrier frequency consist of an overlap of determinable signal portions respectively of all other subcarrier signals, i.e. inter-carrier interference (ICI) occurs, and
  from the respective signal portion at a subcarrier frequency, those determinable signal portions are subtracted in the frequency domain which result from the subcarrier signals of all other subcarriers and thereby, the information losses caused by blanking out the pulse-shaped interferences are compensated for.

According to another aspect of the invention, in the method from the respective signal portion at a subcarrier frequency, those determinable signal portions are subtracted in the frequency domain which result from the subcarrier signals of all other subcarriers and are reconstructed from an estimation of the complex data symbols transmitted on each subcarrier, an estimation of the influence of the trans-mission channel on each subcarrier and knowledge on the position and number of the points affected by the pulse-shaped interference, where pulse blanking has been applied, the estimates for the complex data symbols are obtained by detecting and decoding the received equalized complex symbols and encoding and modulating them again and estimates of the channel coefficients are obtained from channel estimation, and the signal where the undesired signal portions of all other subcarrier signals, namely ICI, have been partly compensated is processed in the same way in further iterations in order to improve the estimates of data symbols and channel coefficients and thereby, the information losses caused by blanking out the pulse-shaped interferences are compensated for.

Thus, according to the invention, it is proposed to eliminate the pulse-shaped interferences in an OFDM-based multi-carrier communication signal by means of pulse blanking. When examining the thus changed OFDM-based signal by windowing, pulse blanking can be perceived as a rectangular window with notches. It is basically known that a signal resulting from a windowing of this type is then (when represented in the frequency domain) characterized in that the signal portions at each subcarrier frequency are obtained by an overlap of determinable signal portions respectively of all other subcarrier signals. The signal portions are determinable and reconstructable because ICI in the OFDM-based signal can be determined from the shape of the subcarrier spectra derived from the pulse blanking window, estimates of the transmitted complex symbols on all subcarriers and estimates of the channel coefficients representing the influence of the transmission channel on all subcarriers. Thus, one can correspondingly compensate for said influences whereby, at the same time, also the information losses occurring in the communication signal, as inherent to pulse blanking, can be compensated for.

In OFDM-based signals, an OFDM symbol is transmitted by the complex symbols modulated on the individual subcarrier signals. In order to compensate for the influence exerted by respectively all other subcarriers on the data transmitted by a subcarrier, it is generally required to know the data symbol transmitted on each subcarrier as well as the respective channel influence on each subcarrier. According to an advantageous suggestion for implementing the inventive method, it is proposed that, in the receiver, the transmitted sequence of data on the subcarrier signals—which sequence forms the data symbol—is to be iteratively determined by first equalizing, detecting and decoding the sequence of the received data, then coding and modulating said sequence again, for use as estimated values for the data symbol, onto the subcarrier signals, wherein these estimated values will be used during the compensation of the influence exerted by the blanking of the pulse-shaped interferences. Symbols that are already known in the receiver such as null symbols in the guard band at the edges of the spectrum and pilot symbols employed for channel estimation are not estimated. Instead, the known values are directly used for the compensation of the influence of pulse blanking. The influence of the transmission channel on each subcarrier is estimated by means of any conventional channel estimation algorithm.

The method of the invention is particularly suited for aeronautical communication if this communication is OFDM-based and is being overlapped e.g. by ground-based navigation systems for distance and/or position determination of an aircraft causing pulse-shaped interference signals at the receiver of the OFDM-based communication system. Herein, it is useful to arrange the OFDM-based communication signals between the center frequencies of adjacent frequency channels of the system for distance and/or position determination of the aircraft.

The invention will be explained in greater detail hereunder by way of an embodiment thereof and with reference to the accompanying drawings.

DETAILED DESCRIPTION OF A PREFERRED EMBODIMENT

Figure 1:
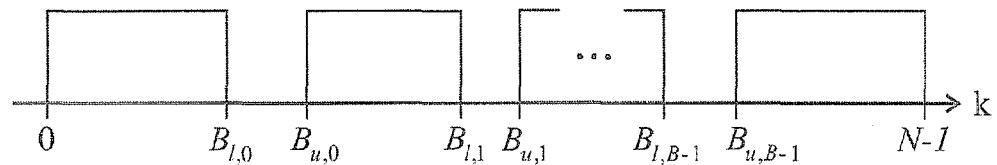
FIG. 1 is a view of a pulse blanking operation performed by means of a rectangular window with notches.
Figure 2:
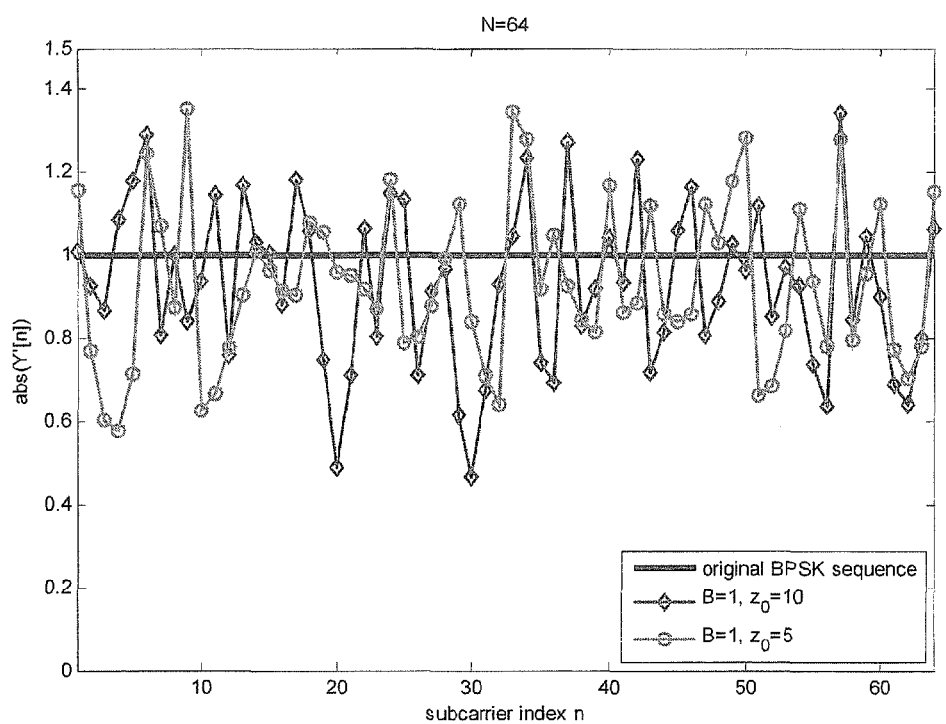
FIG. 2 is a graphical representation of the absolute value of the data symbols received on all subcarriers with and without pulse blanking (in a system with 64 subcarriers)

The description will refer to a simple OFDM system with N subcarriers. At the receiver, the desired OFDM signal and a pulse-shaped interference signal are present in mutual overlap. After suppression of interference by means of pulse blanking, there will occur, in the OFDM signal, B<N−1 portions wherein the received time domain signal has been set to zero. In the first portion, $z_0$ sample values have been set to zero, in the second portion, $z_1$ sample values, and in the last portion, $Z_{B-1}$ sample values. On the whole, $$z = \sum_{b=0}^{B-1} z_b$$

of N sample values have been set to zero. Pulse blanking can be represented as windowing with a rectangular window having notches at the corresponding positions. The resulting window function is shown in FIG. 1. When, in the OFDM receiver, the thus windowed OFDM signal is transformed into the frequency domain by the N-point discrete Fourier transform (DFT) or fast Fourier transform (FFT) the spectrum will considerably differ from the spectrum of the originally transmitted sequence. In FIG. 2, this is illustrated by way of a simple example. A random BPSK (binary phase shift keying) sequence with N=64 values is generated. Without previous pulse blanking, the absolute value of this sequence is constantly 1 on all N subcarriers. If $z_0$=5 and respectively $z_0$=10 successive sample values in the time domain signal are set to zero at a random point, one will obtain, after transformation into the frequency domain, the absolute value—also shown in FIG. 2—of these modified sequences. The noticeable deviations between the original sequence and the sequence after application of pulse blanking will cause difficulties in the estimation of channel coefficients and the detection and decoding of the transmitted data and will massively increase the bit error rate (BER).

Figure 3:
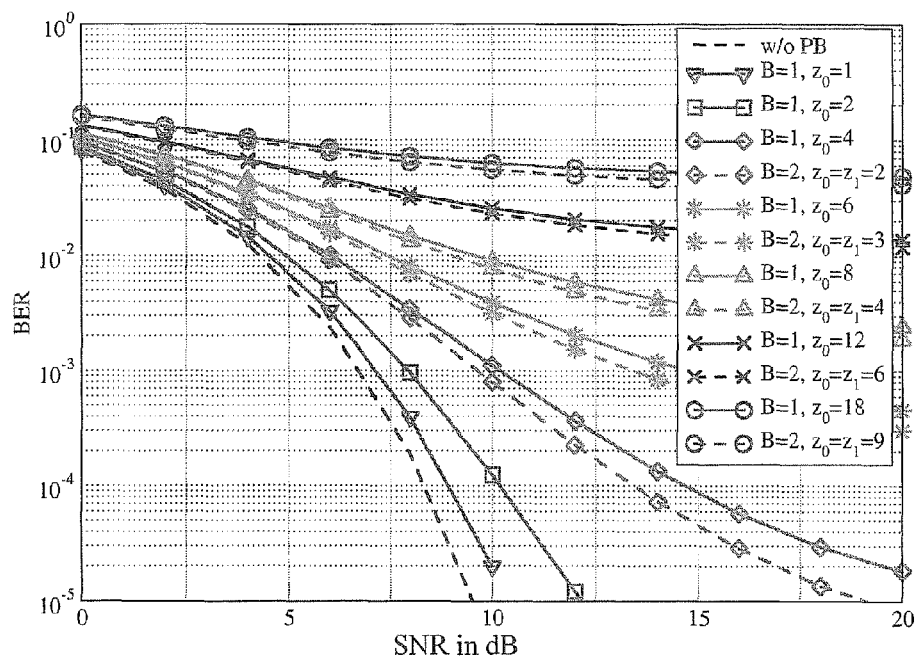
FIG. 3 is a diagram showing the bit error rate (BER) in relation to the signal-to-noise ratio (SNR) after pulse blanking with different numbers and lengths of portions set to zero.

In a simulation of the influence of pulse blanking on the performance of the OFDM system observed herein, a specific number of portions with a specific length was fictively set to zero while the actual interference was left unconsidered. The BER—shown in FIG. 3—for uncoded transmission via an AWGN (additive white Gaussian noise) channel clearly shows the strong influence of the pulse blanking on the performance of the OFDM system.

The influence of the pulse blanking on the OFDM system can be explained by imagining the pulse blanking as a windowing by use of a rectangular window with notches at the respective positions. For B portions wherein the pulse signal is set to zero, the window function (FIG. 1) can be represented as $$w[k] = \begin{cases} 0 & \leq k \leq B_{l,0}, \\ 1 & B_{u,0} \leq k \leq B_{l,1}, \ldots, \\ & B_{u,B-1} \leq k \leq N-1 \\ 0 & \text{otherwise} \end{cases} \quad (1)$$

wherein k=0, ..., N−1, denotes the discrete time variable, and $B_{l,b}$ and respectively $B_{u,b}$ denote the position of the last and respectively first sample value not set to zero, before and respectively after the b-th notch. In pulse blanking, the received signal $$y[k] = \frac{1}{N} \sum_{v=0}^{N-1} d_v H_v e^{j\Omega_v k} + n[k], k = 0, \ldots, N-1 \quad (2)$$

is windowed in the time domain, with $\Omega_v$=2πv/N denoting the normalized discrete subcarrier frequency of the v-th subcarrier, $d_v$ denoting the complex data symbol transmitted on the v-th subcarrier, and $H_v$ denoting the channel influence on the v-th subcarrier. n[k] represents AWGN. After pulse blanking, one has obtained $$y'[k] = w[k] \cdot y[k], k=0, \ldots, N-1. \quad (3)$$

The—in effect—shortened duration of the rectangular window causes a widening of the spectra of the individual subcarriers. Thus, after pulse blanking, the subcarriers are not orthogonal to each other anymore, which will lead to inter-carrier interference (ICI). On each subcarrier, there is thus received an overlap of all subcarriers; this overlap can be easily determined when the modified time domain signal y'[k] is transformed into the frequency domain resulting in $$Y'[n] = \frac{1}{N} \sum_{v=0}^{N-1} d_v H_v \left( \sum_{k=0}^{B_{l,0}} e^{-jk(\Omega-\Omega_v)} + \sum_{b=0}^{B-2} \sum_{k=B_{u,b}}^{B_{l,b+1}} e^{-jk(\Omega-\Omega_v)} + \sum_{k=B_{u,B-1}}^{N-1} e^{-jk(\Omega-\Omega_v)} \right) + N[n] \quad (4)$$

$$= \frac{1}{N} \sum_{v=0}^{N-1} d_v H_v \left( e^{-j(\Omega-\Omega_v)B_{l,0}/2} \frac{\sin((\Omega-\Omega_v)(B_{l,0}+1)/2)}{\sin((\Omega-\Omega_v)/2)} + \sum_{b=0}^{B-2} e^{-j(\Omega-\Omega_v)(B_{l,b+1}+B_{u,b})/2} \frac{\sin\left((\Omega-\Omega_v)\left(\begin{smallmatrix}B_{l,b+1} - \\ B_{u,b}+1\end{smallmatrix}\right)/2\right)}{\sin((\Omega-\Omega_v)/2)} + e^{-j(\Omega-\Omega_v)(N+B_{u,B-1}-1)/2} \frac{\sin((\Omega-\Omega_v)(N-B_{u,B-1})/2)}{\sin((\Omega-\Omega_v)/2)} \right) + N[n]$$

$$= \frac{1}{N} \sum_{v=0}^{N-1} d_v H_v S(\Omega - \Omega_v) + N[n],$$

with $\Omega$=2πn/N and n=0, ..., N−1. $S(\Omega-\Omega_v)$ denotes the spectrum of the v-th subcarrier. N[n] is the equivalent representation of the AWGN in the frequency domain.

Since the influence of each individual subcarrier can be reconstructed, it is made possible, on the n-th subcarrier, to compensate for the influence of all other subcarriers (v≠n) by simple subtraction, resulting in the following equation for the n-th subcarrier:

$$Y^{comp}[n] = Y'[n] - \sum_{\substack{v=0 \\ v \neq n}}^{N-1} d_v H_v S(\Omega - \Omega_v), n = 0, \ldots, N-1. \quad (5)$$

Figure 4:
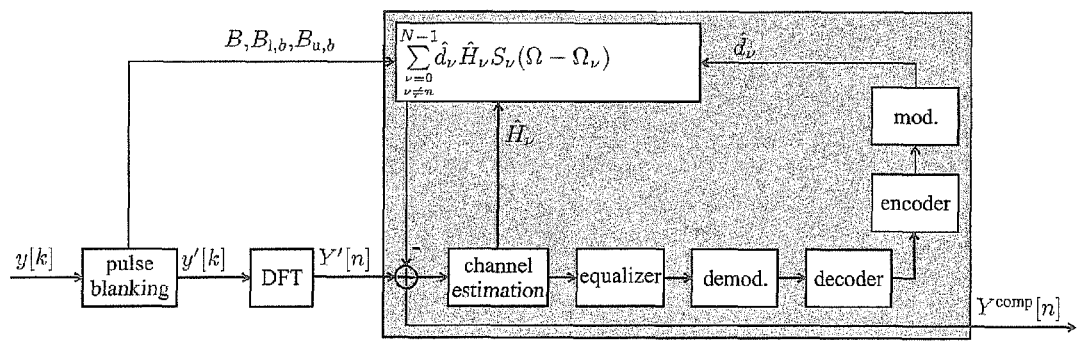
FIG. 4 is a simplified block diagram of the OFDM receiver with compensation of pulse blanking.
Figure 10:
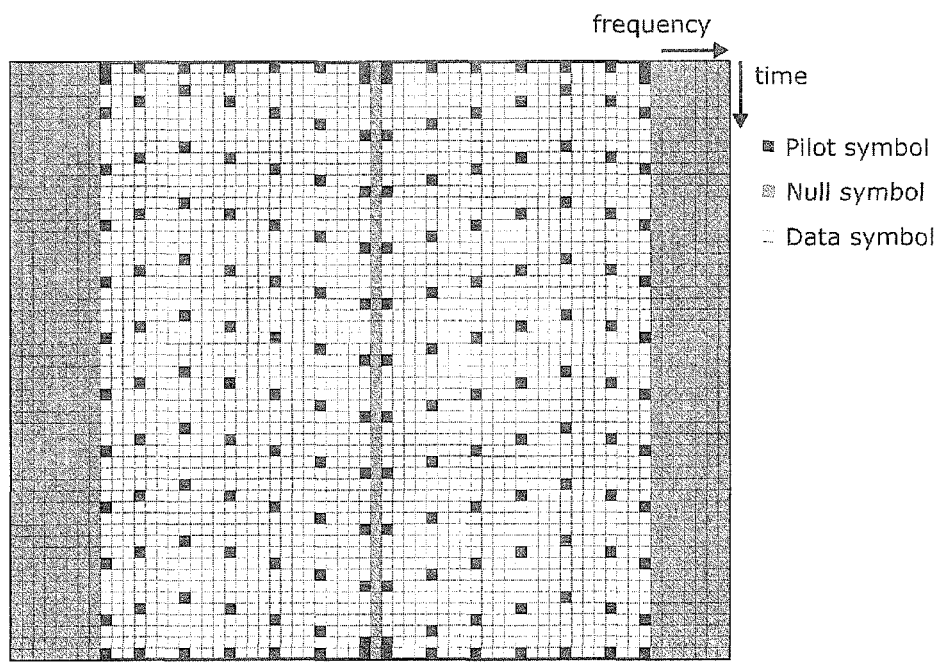
FIG. 10 Example of an OFDM frame consisting of 52 OFDM symbols and containing null, pilot and data symbols, N=64.

In order to compensate for the influence of all other subcarriers, it is required to know the data symbol $d_v$ transmitted as well as the respective channel coefficient $H_v$ on each subcarrier. After channel estimation, that generates estimated values $\hat{H}_v$ of the channel coefficients, and channel equalisation, the transmitted data sequence is iteratively estimated in the receiver in that the received sequence Y'[n] will first be detected and decoded and then will be coded and modulated onto complex symbols again. These estimated values of the transmitted complex data symbols $\hat{d}_v$ are used in the compensation of the influence of pulse blanking according to equation (5). Symbols that are already known in the receiver such as null symbols in the guard band at the edges of the spectrum and pilot symbols employed for channel estimation (see FIG. 10) are not estimated. Instead, the known values are directly used for the compensation of the influence of pulse blanking. The influence of the transmission channel on each subcarrier is estimated by means of any conventional channel estimation algorithm. Thereafter, the compensated signal $Y^{comp}[n]$ will be equalized, detected and decoded in the receiver in the usual manner. For obtaining more-accurate estimated values of the transmitted complex symbols as well as of the channel coefficients and thus achieving an improved compensation, a plurality of iterations can be performed. FIG. 4 shows a simplified block diagram of an OFDM receiver in which the influence of pulse blanking will be compensated for.

In case of ideal knowledge of the transmitted data and the channel coefficients, the loss caused by pulse blanking can be reduced to a small SNR loss which exactly corresponds to the loss of signal energy due to elimination of a specific number z of samples, i.e.

$$SNR^{loss} = 10 \cdot \log_{10}((N-z)/N) \quad (6)$$

Figure 5:
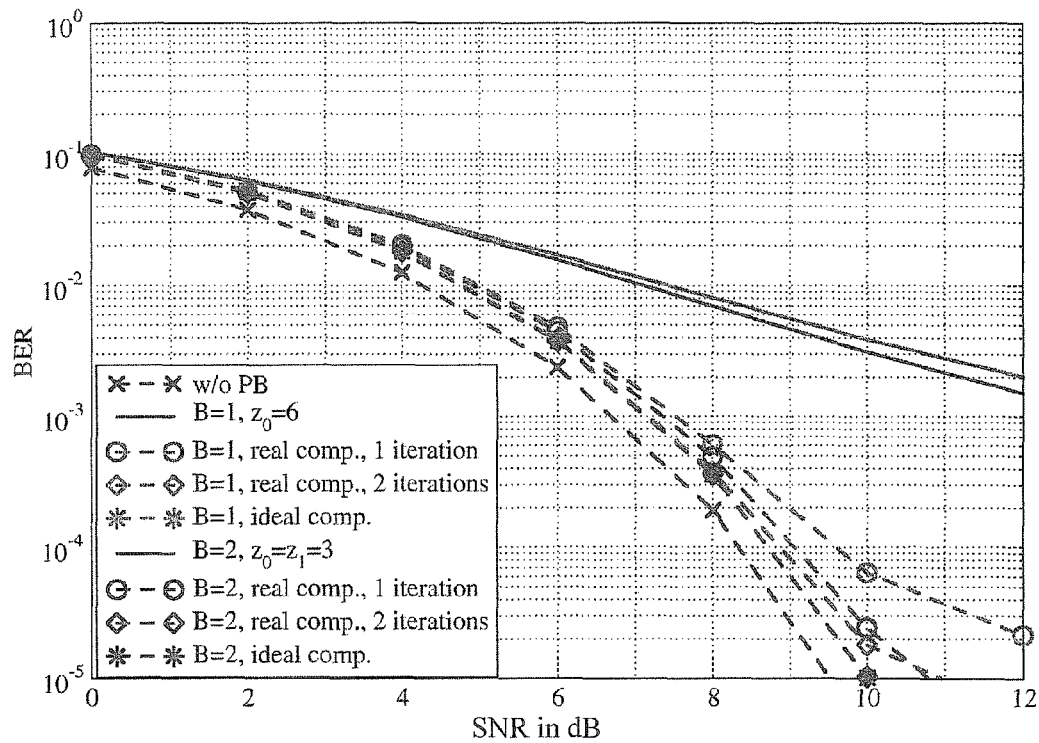
FIG. 5 is a diagram wherein the BER is plotted over SNR after compensation of the influence of pulse blanking assuming perfect channel knowledge.

The performance of the proposed compensation algorithm will now be demonstrated by way of a simple example. The example will refer to a simple OFDM system with N=64 subcarriers. On each of these subcarriers, uncoded QPSK (quarternary phase-shift keying) symbols are transmitted over an AWGN channel. The channel coefficients are assumed to be '1', i.e. the channel is assumed to be perfectly known. In pulse blanking, z=6 samples are set to zero. In this regard, a difference is made between the two cases B=1, $z_0$=6 and B=2 with $z_0$=3, $z_1$=3. From FIG. 5, it can be seen that the influence of pulse blanking can be nearly fully reduced by the compensation. In case of ideal knowledge of the transmitted symbols, only the expected SNR loss will remain. In this example, the SNR is reduced by 0.43 dB. This result well agrees to the theoretically determined SNR loss from equation (6) for the z=6 sample values set to zero. Also in case of non-ideal knowledge of the transmitted symbols, it is possible, by as few as two iterations of equalization, detection, decoding, coding and modulation, to obtain estimated values of the transmitted data sequence which allow for a merely slightly inferior compensation.

For further clarification of the invention, reference will be made hereunder to FIGS. 6 to 9 which show an OFDM signal with and respectively without pulse blanking in the time domain and in the frequency domain.

Now, once more, an OFDM system with N=64 subcarriers will be discussed. For easier survey, only the real parts of the signals on the subcarriers 6 to 8 are shown. Further, the subcarriers are modulated by "+1".

Figure 6:
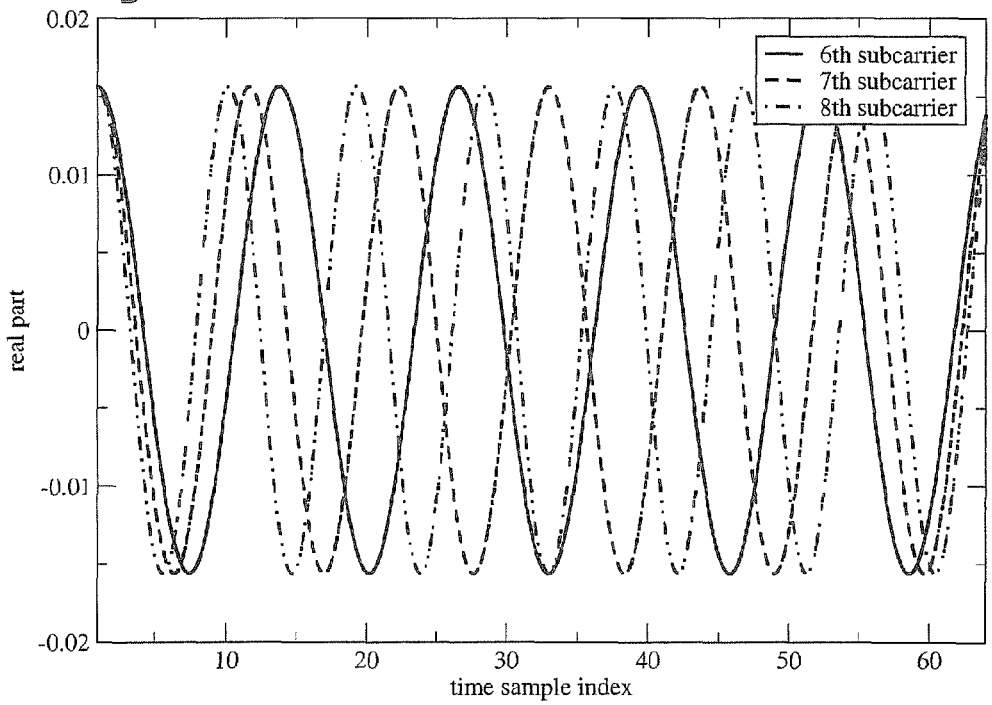
FIG. 6 is a diagram representing an example of an OFDM signal with 64 subcarriers, shown in the time domain, wherein the real part of the signals on the 6th to 8th subcarriers is represented in the time domain and without pulse blanking.

In FIG. 6, an OFDM signal without pulse blanking is shown in the time domain. In the windowing of the received signal as shown in FIG. 7, there has been used, instead of the normal rectangular window, a rectangular window with one notch having a length of 10 sample values, i.e. B=1, $z_0$=10.

Figure 7:
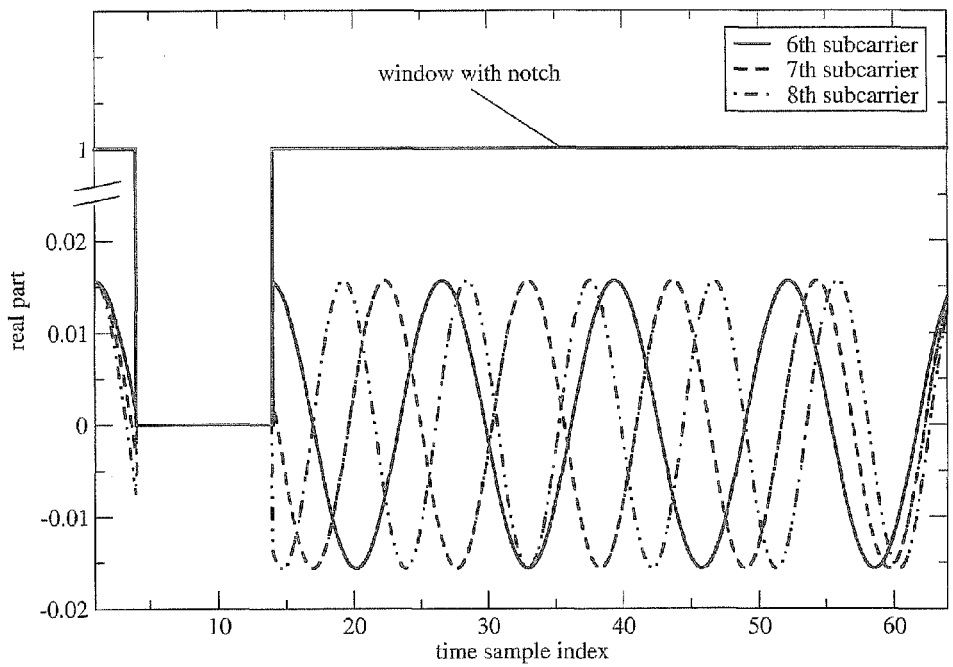
FIG. 7 is a diagram representing the real part of the signals on the 6th to 8th subcarriers in the time domain as well as with pulse blanking (B=1, $z_0$=10)
Figure 8:
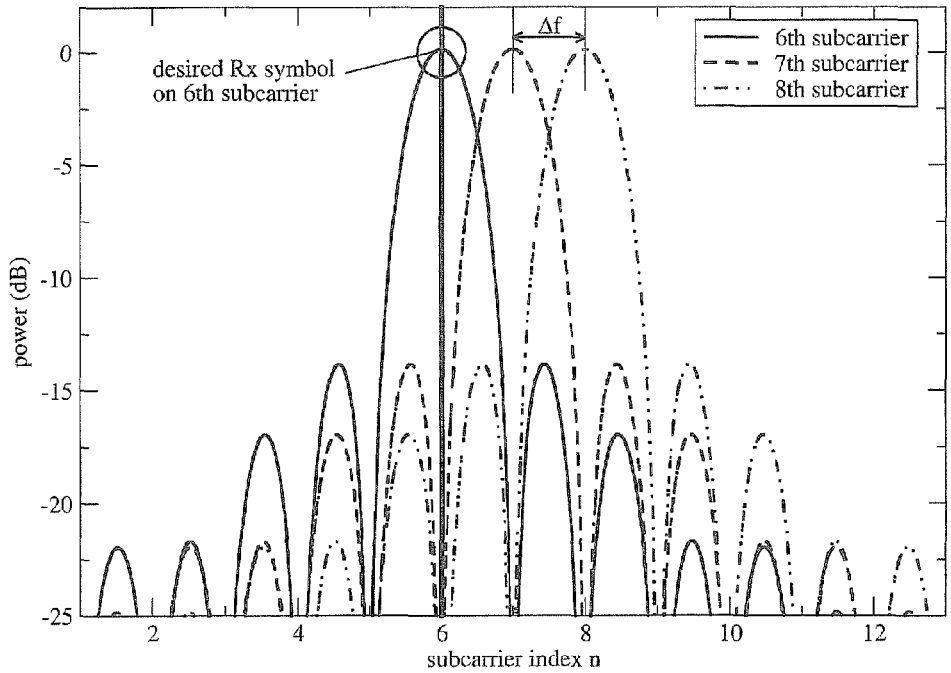
FIG. 8 is a diagram representing the spectra of the subcarriers 6 to 8 without pulse blanking.
Figure 9:
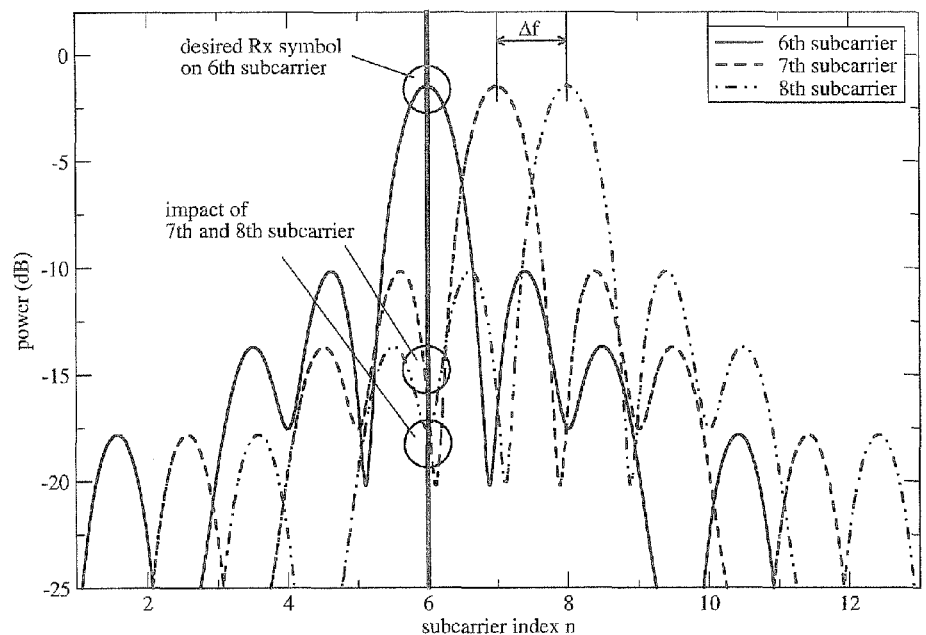
FIG. 9 is a diagram representing the spectra of the subcarriers 6 to 8 after pulse blanking (B=1, $z_0$=10).

FIGS. 8 and 9 show equivalent representations of the above example according to FIGS. 6 and 7 in the frequency domain.

In FIG. 8, for use as reference, the case without pulse blanking is shown in the frequency domain. It can be seen that the adjacent subcarriers because of their orthogonality have no influence on the observed 6th subcarrier.

FIG. 9 shows the spectra of the individual subcarriers after blanking of 10 sample values, i.e. B=1, $z_0$=10. If one observes the 6th subcarrier again, one will first realize that the power of the received symbol is reduced because the blanking entails a reduction of the power of the whole OFDM signal. Second, one will realize the influence of the adjacent subcarriers 7 and 8; this influence is caused by the fact that the subcarrier spacing Δf will remain the same while, however, the shape of the subcarrier spectra will change. On the 6th subcarrier, there is thus received an overlap of the signals of all subcarriers.

For the sake of simplicity and easy survey, all subcarriers have been modulated by "+1" in the present example. In this most favorable case, the amplitudes of all subcarriers will have been reduced in a uniform manner after pulse blanking. In this case, the amplitude of the sample values of the summation signal across all subcarrier spectra is equal at the positions of the individual subcarriers and correspondingly is reduced to a value<1. For a random symbol sequence—in the case of BPSK, consisting of "+1" und "−1"—there is obtained the amplitude, shown in FIG. 2, of the sample values of the summation signal at the positions of the individual subcarriers.

As explained above, the invention, when used in OFDM-based systems, is distinguished by the compensation of the influence caused by pulse blanking. The invention proposes a method which is suited to reverse the influence of pulse blanking in OFDM-based communication systems. Since this method makes use of specific characteristic properties of OFDM signals, such a compensation is possible only in OFDM-based multi-carrier communication systems and the method is applicable only in OFDM-based multi-carrier communication systems.

The invention can be used in cellular mobile and in aeronautical communication systems. Current extensions of the cellular mobile communication standard (3GPP/LTE) and current and planned techniques for wired and wireless networks (WiFi, WiMAX and advanced versions thereof) involve the application of the OFDM technique. The invention can render these systems robust against pulse-shaped interferences. On the aeronautical communication sector, work is currently under way to define a new communication system which is to work in the L-band. One proposed system is based on OFDM; since the L-band is subjected to heavy disturbances by pulse interferences, applying the invention would be particularly beneficial herein (cf. the problematics to be expected in future aeronautic communication as outlined in the introduction herein).

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

Cited Literature

[1] Richard van Nee, Ramjee Prasad, "OFDM for Wireless Multimedia Communications", Artech House Publishers, 2000, Chap. 2, pp. 33-51.
[2] Sergey V. Zhidkov, "Analysis and Comparison of Several Simple Impulsive Noise Mitigation Schemes for OFDM Receivers," IEEE Transactions of Communications, vol. 56, no. 1, pp. 5-9, January 2008.
[3] Grace Xingxin Gao, "DME/TACAN Interference and its Mitigation in L5/E5 Bands," in ION Institute of Navigation Global Navigation Satellite Systems Conference, Fort Worth, Tex., USA, September 2007.
[4] Sergey V. Zhidkov, "Performance Analysis and Optimization of OFDM Receiver With Blanking Nonlinearity in Impulsive Noise Environment," IEEE Transactions on Vehicular Technology, vol. 55, No. 1, pp. 234-242, January 2006.
[5] Sergey V. Zhidkov, "Impulsive Noise Suppression in OFDM Based Communication Systems," IEEE Transactions on Consumer Electronics, Vol. 49, No. 4, November 2003, pp. 944-948.

The invention claimed is:

1. A method for compensation of information losses caused by blanking out pulse-shaped interferences, in a communication signal received by a receiver, wherein, in said method,
the receiver receives a modulated OFDM-based multi-carrier signal comprising an overlap of a sequence of a predetermined number of subcarrier signals whose frequencies differ from each other by a constant amount and which have substantially no signal portions at the frequencies of the respective other subcarrier signals, with pulse-shaped interference signals, wherein complex data symbols are transmitted on each subcarrier,
the pulse-shaped interference signals are eliminated in the receiver by pulse blanking in that the interfering pulses are first detected and then the modulated time domain signal is set to zero at the points affected by the pulse-shaped interference,
the thus obtained signal, when represented by way in the frequency domain, is characterized in that the signal portions at each subcarrier frequency consist of an overlap of determinable signal portions respectively of all other subcarrier signals, and therefore inter-carrier interference (ICI) occurs, and from the respective signal portion at a subcarrier frequency, those determinable signal portions are subtracted in the frequency do-main which result from the subcarrier signals of all other subcarriers and are reconstructed from an estimation of the complex data symbols transmitted on each subcarrier, an estimation of the influence of the transmission channel on each subcarrier and knowledge on the position and number of the points affected by the pulse-shaped interference, where pulse blanking has been applied, the estimates for the complex data symbols are obtained by detecting and decoding the received equalized complex symbols and encoding and modulating them again and estimates of the channel coefficients are obtained from channel estimation, and the signal where the undesired signal portions of all other subcarrier signals, namely ICI, have been partly compensated is processed in the same way in further iterations in order to improve the estimates of data symbols and channel coefficients and thereby, the information losses caused by blanking out the pulse-shaped interferences are compensated for.

2. The method according to claim 1, wherein complex data symbols are modulated on the subcarrier frequencies and, in the receiver, the transmitted sequence of data symbols is iteratively determined by first detecting and decoding the sequence of the received data on the subcarriers, then coding said sequence again and modulating the sequence, for use as estimated values for the complex data symbol, onto the subcarrier frequencies, wherein these estimated values are used during the process of compensating for the influence of the blanking of the pulse-shaped interferences.

3. The method according to claim 1, wherein the received communication signal represents an overlap of, on the one hand, a pulse-shaped signal of a system for distance and/or position determination of an aircraft, particularly such a system of the ground-based type, and respectively, a radio system for data transmission, particularly such a system of the military type, and, on the other hand, an OFDM-based signal.

4. The method according to claim 3, wherein the signal of said ground-based system for distance and/or position determination of an air-craft, is a DME/TACAN signal or a JTIDS/MIDS signal with a plurality of frequency channels, the OFDM-based signal being positioned between the center frequencies of adjacent frequency channels or onto the center frequencies of said DME/TACAN and respectively JTIDS/MIDS signal.

* * * * *